US008487684B2

(12) United States Patent
Hsieh et al.

(10) Patent No.: US 8,487,684 B2
(45) Date of Patent: Jul. 16, 2013

(54) METHOD FOR BUFFERING CLOCK SKEW BY USING A LOGICAL EFFORT

(75) Inventors: Chung-Ying Hsieh, Hsinchu (TW); Ming-Hung Chang, Hsinchu (TW); Wei Hwang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 85 days.

(21) Appl. No.: 13/155,523

(22) Filed: Jun. 8, 2011

(65) Prior Publication Data
US 2012/0169394 A1 Jul. 5, 2012

(30) Foreign Application Priority Data

Dec. 30, 2010 (TW) ................................ 99146856 A

(51) Int. Cl.
*G06F 1/04* (2006.01)
*H03K 3/00* (2006.01)

(52) U.S. Cl.
USPC ............ 327/291; 327/295; 327/298; 327/299

(58) Field of Classification Search
USPC .................................................. 327/291, 299
See application file for complete search history.

(56) References Cited

U.S. PATENT DOCUMENTS

| | | |
|---|---|---|
| 6,653,883 B2 | 11/2003 | Schultz |
| 2004/0181354 A1* | 9/2004 | Gauthier et al. ................. 702/99 |

OTHER PUBLICATIONS

Ragheb et al., "Design of Thermally Robust Clock Trees Using Dynamically Adaptive Clock Buffers", IEEE Transactions on Circuits and Systems, vol. 56, No. 2, pp. 374-383 (2009).

* cited by examiner

*Primary Examiner* — John Poos
(74) *Attorney, Agent, or Firm* — Edwards Wildman Palmer LLP; Peter F. Corless; Steven M. Jensen

(57) ABSTRACT

A method buffers clock skew by using a logical effort, and is applicable to a clock tree that stays in a strong-inversion region, a moderate-inversion region, or a weak-inversion region. The method includes establishing in the clock tree a temperature sensor and a tunable-width buffer, and establishing width and temperature comparative lists according to a logical effort equation, for the tunable-width buffer to be individually applied to the strong-inversion region, the moderate-inversion region, and the weak-inversion region; selecting one from the width and temperature comparative lists that corresponds to one of the inversion regions in which the clock tree stays, enabling the temperature sensor to sense a temperature, and searching the selected width and temperature comparative list for a width that corresponds to the temperature sensed by the temperature sensor; and enabling the tunable-width buffer to perform a width modulation process according to the searched width.

8 Claims, 5 Drawing Sheets

| TL(°C) | TR(°C) | Clock Skew @0.3V | | | Clock Skew @0.5V | | |
|---|---|---|---|---|---|---|---|
| | | Before (ns) | After (ns) | Improve-ment | Before (ns) | After (ns) | Improve-ment |
| -25 | 0 | 101.4 | 5.6 | 94.5% | 1.055 | 0.120 | 88.6% |
| | 25 | 153.8 | 7.6 | 95.1% | 1.769 | 0.327 | 81.5% |
| | 50 | 183.2 | 18.6 | 89.8% | 2.259 | 0.476 | 79.0% |
| | 75 | 200.9 | 19.0 | 90.5% | 2.645 | 0.641 | 75.8% |
| | 100 | 212.2 | 25.7 | 87.9% | 2.891 | 0.800 | 72.3% |
| | 125 | 219.7 | 27.4 | 87.5% | 3.108 | 0.873 | 71.9% |
| 0 | 25 | 52.4 | 2.0 | 96.1% | 0.714 | 0.207 | 71.0% |
| | 50 | 81.8 | 13.1 | 84.0% | 1.205 | 0.356 | 70.5% |
| | 75 | 99.5 | 13.4 | 86.5% | 1.590 | 0.521 | 67.3% |
| | 100 | 110.8 | 20.1 | 81.9% | 1.836 | 0.680 | 63.0% |
| | 125 | 118.3 | 21.9 | 81.5% | 2.054 | 0.753 | 63.3% |
| 25 | 50 | 29.4 | 11.0 | 62.5% | 0.490 | 0.149 | 69.7% |
| | 75 | 47.1 | 11.4 | 75.8% | 0.876 | 0.313 | 64.2% |
| | 100 | 58.4 | 18.0 | 69.1% | 1.122 | 0.473 | 57.9% |
| | 125 | 65.9 | 19.8 | 69.9% | 1.340 | 0.546 | 59.2% |
| 50 | 50 | 17.7 | 0.4 | 97.8% | 0.386 | 0.165 | 57.2% |
| | 75 | 29.0 | 7.0 | 75.7% | 0.632 | 0.324 | 48.7% |
| | 125 | 36.5 | 8.8 | 75.8% | 0.849 | 0.398 | 53.2% |
| 75 | 100 | 11.3 | 6.6 | 41.2% | 0.246 | 0.159 | 35.4% |
| | 125 | 18.8 | 8.4 | 55.1% | 0.464 | 0.233 | 49.8% |
| 100 | 125 | 7.5 | 1.8 | 76.2% | 0.217 | 0.073 | 66.2% |

FIG. 7

METHOD FOR BUFFERING CLOCK SKEW BY USING A LOGICAL EFFORT

CROSS-REFERENCES TO RELATED APPLICATIONS

This application claims under 35 U.S.C. §119(a) the benefit of Taiwanese Application No. 99146856, filed Dec. 30, 2010, the entire contents of which is incorporated herein by reference.

BACKGROUND OF THE INVENTION

1. Field of the Invention

This invention relates to method for buffering clock skew, and, more particularly, to a method for buffering clock skew by using a logical effort.

2. Description of Related Art

Data in a digital circuit flow simultaneously in accordance with a clock signal. The clock signal may be skewed when the digital circuit operates in a low temperature environment. Therefore, how to diminish the clock skew effect generated because of the temperature variation is becoming one of the most popular research topics in the art.

U.S. Pat. No. 6,653,883 disclosed a clock tree buffering technique that may diminish the clock skew. The clock tree uses a temporary clock buffer to transmit a reference clock signal, in order to minimize the clock skew. In practice, a clock tree deskew circuit reduces the clock tree skew in repeated intervals over a period of time. The transmission of reference clock signal needs a great amount of layout, requires a lot of capacitors, and consumes much power. Therefore, the clock tree buffering technique has a very limited number of uses.

The IEEE proposed on February, 2009 a thesis, entitled "Design of Thermally Robust Clock Tree Using Dynamically Adaptive Clock Buffers," which disclosed a clock deskew technique that can be applied to a clock tree. A clock buffer is installed in an operation voltage of one volt, and a temperature sensor is used to sense temperature information at different points of the clock tree. The clock buffer has a driving force that is adjusted in an analog manner according to the temperature information, so as to diminish the clock skew. However, a modern chip has to be applied to an extremely low voltage region of a near-threshold and sub-threshold, that is a moderate-inversion region or a weak-inversion region. The technique disclosed by the thesis is limited to an operation voltage of one volt, and can be applied to a strong-inversion region only. In other words, the technique cannot perform a clock buffering process on a clock tree operating in the near-threshold voltage or the sub-threshold voltage.

Therefore, how to provide a clock buffering technique that may be applied to a clock tree operating in the near-threshold voltage or the sub-threshold voltage is becoming one of the most popular topics in the art.

SUMMARY OF THE INVENTION

In view of the above-mentioned problems of the prior art, it is a primary objective of the present invention to provide a clock buffering technique that may be used by a clock tree operating in a sub-threshold voltage or a near-threshold voltage.

The present invention provides a method for buffering clock skew by using a logical effort. The method is applicable to a clock tree that stays in a strong-inversion region, a moderate-inversion region, or a weak-inversion region, and includes: establishing in the clock tree a temperature sensor and a tunable-width buffer, and establishing width and temperature comparative lists according to a logical effort equation, for the tunable-width buffer to be individually applied to the strong-inversion region, the moderate-inversion region, and the weak-inversion region; selecting one from the width and temperature comparative lists that corresponds to one of the inversion regions in which the clock tree stays, enabling the temperature sensor to sense a temperature, and searching the selected width and temperature comparative list for a width that corresponds to the temperature sensed by the temperature sensor; and enabling the tunable-width buffer to perform a width modulation process according to the searched width.

In an embodiment of the present invention, the step of establishing the width and temperature comparative lists, according to a logical effort equation, for the tunable-width buffer to be individually applied to the strong-inversion region, the moderate-inversion region, and the weak-inversion region, further comprises: deriving polynomial equations for the logical effort with respect to temperature and voltage, according to the logical effort equation, that are individually applied to the strong-inversion region, the moderate-inversion region, and the weak-inversion region; and establishing the width and temperature comparative lists, according to each of the derived polynomial equation for the logical effort with respect to temperature and voltage that are individually applied to the strong-inversion region, the moderate-inversion region, and the weak-inversion region.

According to the method, the present invention may adjust a width of a buffer dynamically according to the sensed temperature. Accordingly, the logical effort of each of the buffers may maintain at a constant value, and the nodes in the clock tree have the same delay effects, such that the clock skew is greatly reduced.

BRIEF DESCRIPTION OF DRAWINGS

The invention can be more fully understood by reading the following detailed description of the preferred embodiments, with reference made to the accompanying drawings, wherein:

FIG. 7 is a statistical table of experiments conducted by a method for buffering clock skew by using a logical effort according to the present invention.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
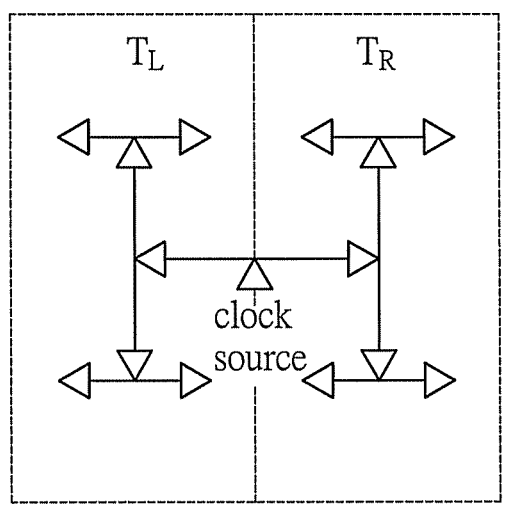
FIG. 1 is a schematic diagram of a method for buffering clock skew by using a logical effort according to the present invention.

The present invention provides a method for buffering clock skew by using a logical effort, that is applied to a clock tree operating in a strong-inversion region, a moderate-inversion region, or a weak-inversion region. In an embodiment of the present invention, the strong-inversion region indicates that the operation voltage is 1 volt, the moderate-inversion region indicates that the operation voltage is 0.5 voltage, the weak-inversion region indicates that the operation voltage is 0.3 volt, and the clock tree is an H-shaped clock tree 10, as shown in FIG. 1.

In implementing the present invention, a temperature sensor and a tunable-width buffer are established in a clock tree, and a width and temperature comparative list is also established according to a logical effort equation, for the buffer to be individually applied to the strong-inversion region, the moderate-inversion region, and the weak-inversion region.

Figure 2:
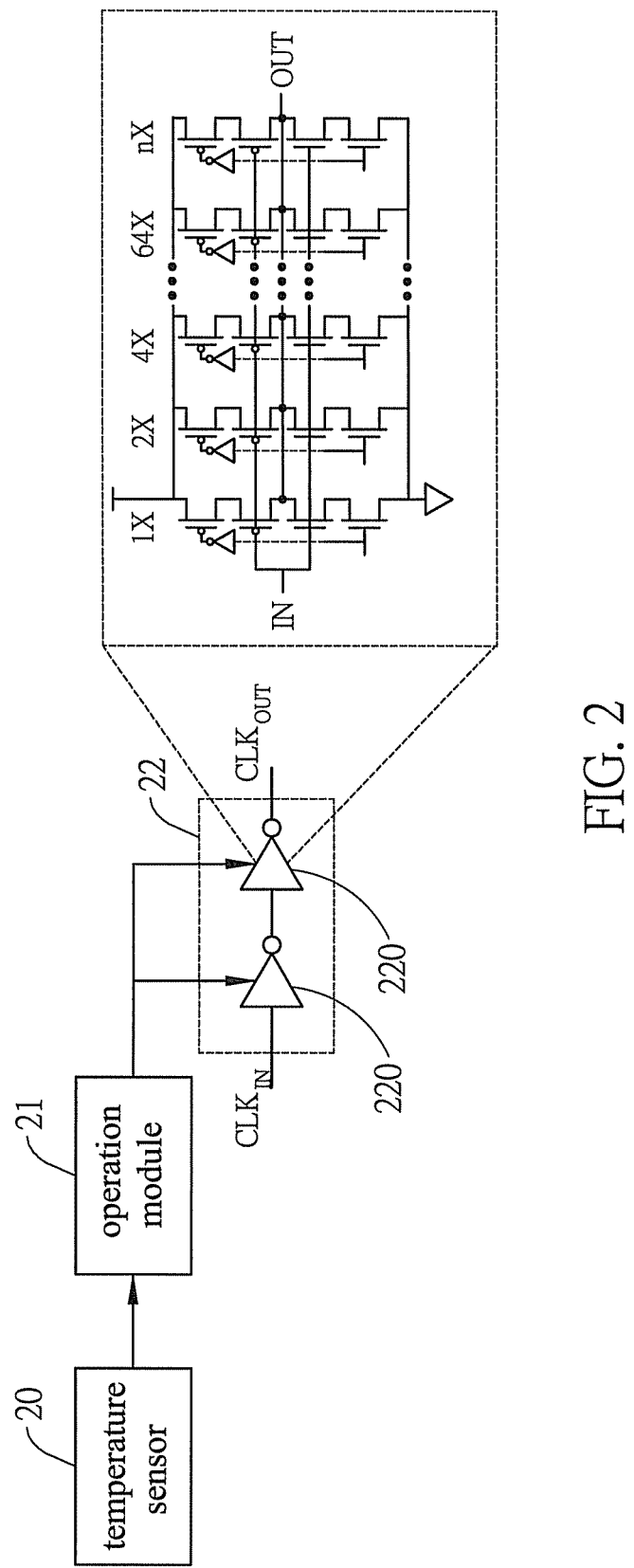
FIG. 2 is a structural schematic diagram of nodes of the clock tree shown in FIG. 1.

In practice, each node in the clock tree is established with a temperature sensor 20, an operation module 21, and a tunable-width buffer 22, as shown in FIG. 2. The tunable-width buffer 22 may comprise two tunable-width inverters 220 that have a width that can be modulated from 1× to n×.

The width and temperature comparative lists are then established, according to the logical effort equation, for the buffer to be individually applied to the strong-inversion region, the moderate-inversion region, and the weak-inversion region. In this step, polynomial equations for the logical effort with respect to temperature and voltage that are individually to the strong-inversion region, the moderate-inversion region, and the weak-inversion region are first derived according to the logical effort equation, and the width and temperature comparative lists are then established, according to the polynomial equations for the logical effort with respect to temperature and voltage, for the tunable-width buffer 22 to be individually applied to the strong-inversion region, the moderate-inversion region, and weak-inversion region, and are stored in a related memory module (not shown).

The logical effort equations include $d_{abs}=\tau(f+p)=\tau(gh+p)$, $$g = \frac{R_t C_{int}}{R_{inv} C_{inv}} = kR_t C_{int} = k\frac{V_{DD}}{I_D}C_{int}, \text{ and } 1/g = \frac{I_D}{kV_{DD}C_{int}},$$

where g represents the logical effort, $R_{inv}$ an output resistance of an inverter, $C_{inv}$ an output capacitance of the inverter, $R_t$ an output resistance of a specific gate, $C_{int}$ an output capacitance of the specific gate, k a constant of $$\frac{1}{R_{inv}C_{inv}}, R_t \frac{V_{DD}}{I_D},$$

and $I_D$ a drain current of a metal oxide semiconductor field effect transistor (MOSFET).

According to the logical effort equation, current equations of a near-threshold and a sub-threshold is simplified, i.e., $I_D=(W/L)C_{OX}\mu_{eff}(1/\eta)(V_{DD}-V_T)^2$ and $$I_D = (W/L)\mu_0 C_{OX} \frac{\eta}{\beta^2}\exp[(\beta/\eta)(V_{DD}-V_T-\eta/\beta)],$$

respectively. Subsequently, by operating collectively the polynomial equations for the logical effort with respect to temperature and voltage that are applied to the strong-inversion region, the moderate-inversion region, and the weak-inversion region are derived. The polynomial equation for the logical effort with respect to temperature and voltage that is applied to the strong-inversion region is $$1/g_u = A(T)\frac{(V_{DD}-V_{T0}+aT)^{3/2}}{V_{DD}},$$

where $g_u$ represents a unified logical effort; T is temperature, V is a voltage, and A(T) is a second-order polynomial function of temperature. The polynomial equation for the logical effort with respect to temperature and voltage that is applied to the moderate-inversion region is $1/g_u=B(T)V_{DD}^2+C(T)V_{DD}+D(T)$, where $g_u$ represents a unified logical effort, T is a temperature, V is voltage, and B(T), C(T) and D(T) are second-order polynomial functions of temperature. The polynomial equation for the logical effort with respect to temperature and voltage that is applied to the weak-inversion region is $1/g_u=E(T)\exp\{F(T)[V_{DD}-V_{T0}]\}$, where $g_u$ represents a unified logical effort, T is a temperature, V is a voltage, E(T) is a fourth-order polynomial function of temperature, and F(T) is a second-polynomial function of temperature.

Figure 3:
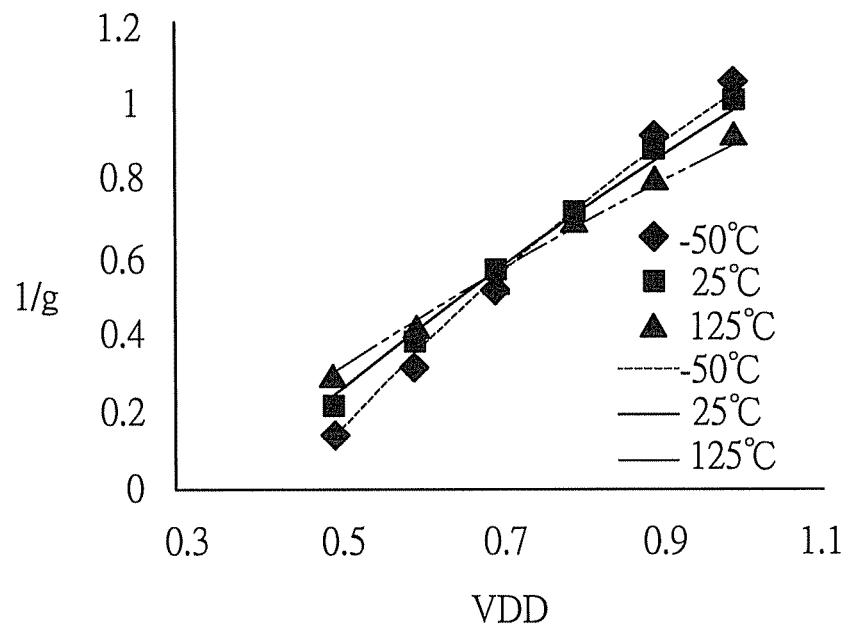
FIG. 3 shows a relation between a voltage and a reciprocal of a logical effort derived by a method for buffering clock skew by using a logical effort according to the present invention.
Figure 4:
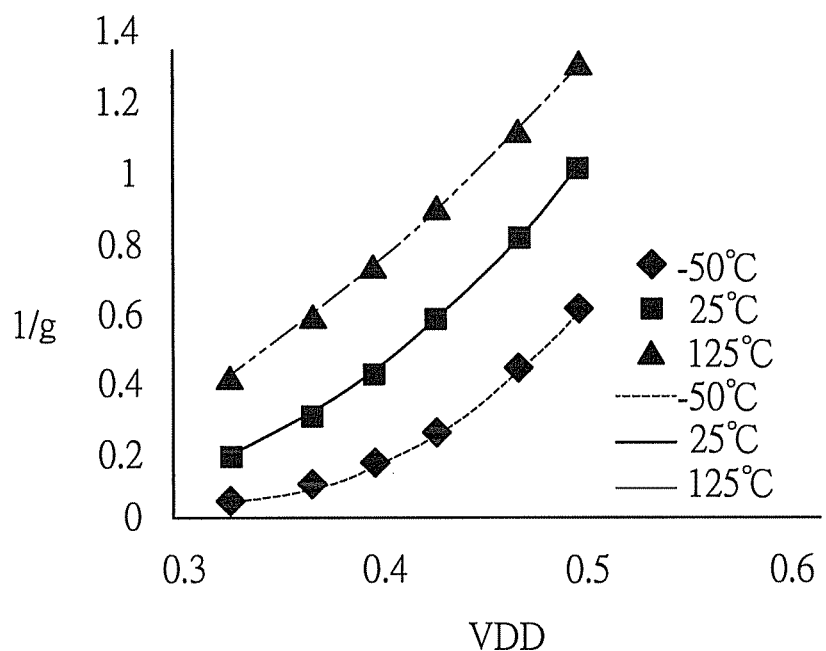
FIG. 4 shows another relation between a voltage and a reciprocal of a logical effort derived by a method for buffering clock skew by using a logical effort according to the present invention.
Figure 5:
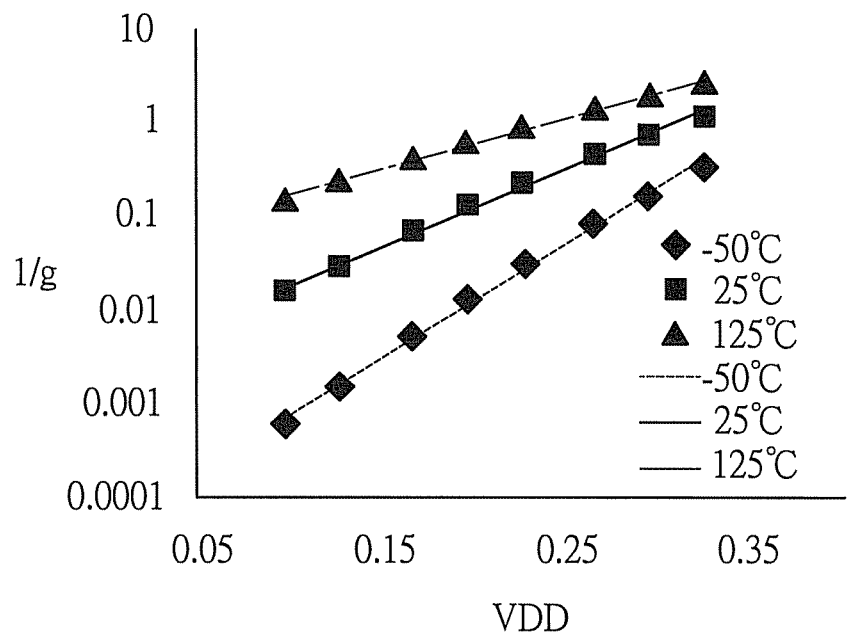
FIG. 5 shows yet another relation between a voltage and a reciprocal of a logical effort derived by a method for buffering clock skew by using a logical effort according to the present invention.

According to the polynomial equation for the logical effort and temperature and voltage that is applied to the strong-inversion region, the polynomial equation for the logical effort with respect to temperature and voltage that is applied to the moderate-inversion region, and the polynomial equation for the logical effort with respect to temperature and voltage that is applied to the weak-inversion region, relation diagrams between a voltage and a reciprocal of the logical effort shown in FIGS. 3-5 may be calculated under different temperatures and voltages.

Figure 6:
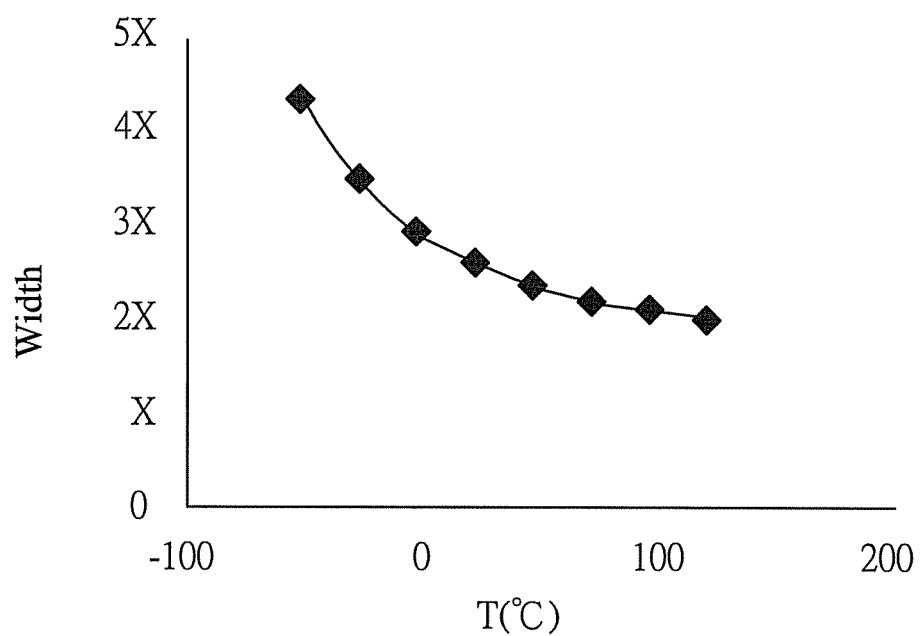
FIG. 6 shows a width and temperature comparative list derived by a method for buffering clock skew by using a logical effort according to the present invention.

Since the unified logical effort is inversely proportional to $I_D$, and $I_D$ is proportional to a width of the tunable-width inverter 220, a relation equation $$\frac{g_{W2}(V,T)}{g_{W1}(V,T)} = \frac{W_1}{W_2}$$

is thus obtained. In order to reduce the clock skew, $g_{w2}(V,T)$ is set to be 1, and a relation equation $W_2=W_1\times g_{W1}(V_{SUPPLY},T)$ is thus obtained. By coordinating $W_2=W_1\times g_{W1}(V_{SUPPLY},T)$ with the relation diagrams shown in FIGS. 3-5, width and temperature comparative lists that are individually applied to the strong-inversion region, the moderate-inversion region, and the weak-inversion region can be obtained. In order to understand the width and temperature comparative lists, a curved graph of FIG. 6 is used to represent the width and temperature comparative list that is applied to the moderate-inversion region.

After the width and temperature comparative lists that are applied to the strong-inversion region, the moderate-inversion region, and the weak-inversion region, respectively, are obtained, an appropriate width and temperature comparative list is selected from the width and temperature comparative lists according to the inversion region where the clock tree 10 stays, and the temperature sensor 20 is enabled to sense temperature, to search the selected width and temperature comparative list for a width that corresponds to the sensed temperature. When the clock tree 10 begins to operate, the temperature sensor 20 senses temperature simultaneously, to sense instant temperature variations at each node. At the same time, the operation module 21 determines the inversion region where the clock tree 10 stays according to the obtained supply voltage, selects an appropriate width and temperature comparative list from the width and temperature comparative lists established previously according to the inversion region, and searches the selected width and temperature comparative list for a width that corresponds to the temperature sensed by the temperature sensor 20, for a subsequent modulation process.

After the width is searched, the operation module 21 enables the tunable-width buffer 22 to perform a corresponding width modulation process according to the searched width. Of course, since the tunable-width buffer 22 comprises two tunable-width inverters 220, the operation module 21 enables the two tunable-width inverters 220 to perform the width modulation process simultaneously. For instance, supposed that the operation module 21 determines that the clock tree 10 stays in the moderate-inversion region, the operation module 21 may select the width and temperature comparative list depicted in FIG. 6. When the temperature sensor 20 senses the temperature variation that is equal to 0° C., the operation module 21 may search the width and temperature comparative list depicted in FIG. 6 a width that corresponds to 0° C., and issues to the tunable-width buffer 22 a modulation command indicating that "the modulation width is 3×". After receiving the modulation command, the tunable-width inverters 220 contained in the tunable-width buffer 22 are modulated to 3×, in order to reduce the clock skew generated because the temperature changes from the original temperature variation to 0° C.

Experiment results shown in FIG. 7 may be obtained by dividing the clock tree 10 shown in FIG. 1 into a left test region $T_L$ and a right test region $T_R$ for practical tests. As indicated by one of the experiment results, when the clock tree 10 stays in the inversion region with a supply voltage of as low as 0.3 volt, the left test region $T_L$ is set to have a temperature of −25° C., and the right test region $T_R$ is set to have a temperature of 0° C., a clock skew, before the performance of the width modulation process, is 101.4 ns, while the clock skew, after the performance of the width modulation process, is greatly reduced to 5.6 ns, which is 5.5% of the original clock skew. It is thus known that the method for buffering the clock skew by using the logical effort according to the present invention indeed has an efficacy of reducing the clock skew.

Compared with the prior art, the present invention first establishes polynomial equations for the logical effort with respect to temperature and voltage that are individually applied to the strong-inversion region, the moderate-inversion region, and the weak-inversion region, and then calculates the width and temperature comparative lists that are applied to the strong-inversion region, the moderate-inversion region, and the weak-inversion region. Therefore, a width of a buffer may be adjusted dynamically according to the sensed temperature, and the logical effort of each of the buffers in the clock tree may also be adjusted accordingly. Accordingly, the logical effort of each of the buffers may maintain at a constant value, and the nodes in the clock tree have the same delay effects, such that the clock skew is greatly reduced.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A method for buffering clock skew with a logical effort, applicable to a clock tree that stays in a strong-inversion region, a moderate-inversion region, or a weak-inversion region, the method comprising the steps of:
   establishing in the clock tree a temperature sensor and a tunable-width buffer, and establishing width and temperature comparative lists, according to a logical effort equation, for the tunable-width buffer to be individually applied to the strong-inversion region, the moderate-inversion region, and the weak-inversion region;
   selecting one from the width and temperature comparative lists that corresponds to one of the inversion regions in which the clock tree stays, enabling the temperature sensor to sense a temperature, and searching the selected width and temperature comparative list for a width that corresponds to the temperature sensed by the temperature sensor; and
   enabling the tunable-width buffer to perform a width modulation process according to the searched width.

2. The method of claim 1, wherein the step of establishing width and temperature comparative lists according to the logical effort equation, for the tunable-width buffer to be individually applied to the strong-inversion region, the moderate-inversion region, and the weak-inversion region, further comprises the steps of:
   deriving polynomial equations for the logical effort with respect to temperature and voltage, according to the logical effort equation, that are individually applied to the strong-inversion region, the moderate-inversion region, and the weak-inversion region; and
   establishing the width and temperature comparative lists, according to each of the derived polynomial equations for the logical effort with respect to temperature and voltage, that are individually applied to the strong-inversion region, the moderate-inversion region, and the weak-inversion region.

3. The method of claim 2, wherein the polynomial equation for the logical effort with respect to the temperature and the voltage that is applied to the strong-inversion region is $$1/g_u = A(T)\frac{(V_{DD} - V_{T0} + aT)^{3/2}}{V_{DD}},$$

where $g_u$ represents a unified logical effort, T is a temperature, V is a voltage, and A(T) represents a second-order polynomial function of temperature.

4. The method of claim 2, wherein the polynomial equation for the logical effort with respect to temperature and voltage that is applied to the moderate-inversion region is $1/g_u = B(T)V_{DD}^2 + C(T)V_{DD} + D(T)$, where $g_u$ represents a unified logical effort, T is a temperature, V is a voltage, and B(T), C(T), D(T) are second-order polynomial functions of temperature.

5. The method of claim 2, wherein the polynomial equation for the logical effort with respect to temperature and voltage that is applied to the weak-inversion region is $1/g_u = E(T)\exp\{F(T)[V_{DD} - V_{T0}]\}$, where $g_u$ represents a unified logical effort, T is a temperature, V is a voltage, E(T) is a fourth-order polynomial function of temperature, and F(T) is a second-order polynomial function of temperature.

6. The method of claim 1, wherein the step of selecting one from the width and temperature comparative lists, that corresponds to one of the inversion regions in which the clock tree stays, further comprises: determining an inversion region in which the clock tree stays according to a supply voltage of the clock tree, and selecting an appropriate width and temperature comparative list from the established width and temperature comparative lists according to the determined inversion region.

7. The method of claim 1, wherein the tunable-width buffer comprises two tunable-width inverters.

8. The method of claim 7, wherein the step of enabling the tunable-width buffer to perform a width modulation process according to the searched width indicates enabling the two tunable-width inverters to perform the width modulation process simultaneously according to the searched width.

* * * * *